United States Patent
Sigal et al.

(10) Patent No.: US 9,754,431 B2
(45) Date of Patent: Sep. 5, 2017

(54) METHOD AND SYSTEM FOR A KEY FOB BASE STATION ENABLING REMOTE CAR ACCESS USING A NOMADIC DEVICE

(71) Applicant: MYINE ELECTRONICS, INC., Ferndale, MI (US)

(72) Inventors: Jacob R. Sigal, Ferndale, MI (US); Joey Ray Grover, Madison Heights, MI (US); Michael Burke, Detroit, MI (US); Scott Smereka, Warren, MI (US); Joel J. Fischer, Royal Oak, MI (US)

(73) Assignee: Livio, Inc., Royal Oak, MI (US)

( * ) Notice: Subject to any disclaimer, the term of this patent is extended or adjusted under 35 U.S.C. 154(b) by 16 days.

(21) Appl. No.: 14/461,848

(22) Filed: Aug. 18, 2014

(65) Prior Publication Data
US 2016/0049033 A1    Feb. 18, 2016

(51) Int. Cl.
  *C07C 9/00*   (2006.01)
  *B60R 25/24*  (2013.01)
  *G07C 9/00*   (2006.01)

(52) U.S. Cl.
  CPC .......... *G07C 9/00309* (2013.01); *B60R 25/24* (2013.01); *B60R 2325/205* (2013.01)

(58) Field of Classification Search
  None
  See application file for complete search history.

(56) References Cited

U.S. PATENT DOCUMENTS

| | | | |
|---|---|---|---|
| 8,847,731 B2 * | 9/2014 | Tieman | B60R 25/24 340/425.5 |
| 9,134,956 B2 * | 9/2015 | Yamashita | B60R 25/40 |
| 2002/0070879 A1 * | 6/2002 | Gazit | B60R 25/04 340/901 |
| 2008/0082221 A1 | 4/2008 | Nagy | |
| 2009/0184800 A1 * | 7/2009 | Harris | G08C 17/00 340/5.21 |
| 2010/0235891 A1 | 9/2010 | Oglesbee et al. | |
| 2014/0091903 A1 | 4/2014 | Birkel et al. | |
| 2014/0176301 A1 * | 6/2014 | Fernandez Banares | G07C 9/00015 340/5.26 |

OTHER PUBLICATIONS

Wired © 2014, <http:/wired.com/2012/12/death-to-the-key-fob/>, 15 pages.

(Continued)

*Primary Examiner* — Daniell L Negron
(74) *Attorney, Agent, or Firm* — Jennifer M. Stec; Brooks Kushman P.C.

(57) ABSTRACT

A vehicle key base station is configured to comprise at least one controller in communication with a key fob and a nomadic device using one or more transceivers. The at least one controller may be configured to receive a security code request from the nomadic device. The at least one controller may be further configured to verify the nomadic device is approved to communicate with vehicle key fob based on a pre-registration configuration. If the nomadic device is approved, the at least one controller may be further configured to transmit the request to the key fob and receive the vehicle security code from the key fob. The at least one controller may be further configured to transmit the vehicle security code to the nomadic device.

16 Claims, 6 Drawing Sheets

(56) References Cited

OTHER PUBLICATIONS

Sean Johnston, 2013, <http://social.ford.com/our-articles/cuvs/edge/remote-access-makes-your-smartphone-a-virtual-keyfob/>, 6 pages.
Verizon Wireless © 2014, <http://vrizonwireless.com/wcms/consumer/devices/delphi-connect>, 5 pages.

* cited by examiner

METHOD AND SYSTEM FOR A KEY FOB BASE STATION ENABLING REMOTE CAR ACCESS USING A NOMADIC DEVICE

TECHNICAL FIELD

The present disclosure relates to an electronic key system for managing a vehicle electronic key.

BACKGROUND

U.S. Patent Application 2010/0235891 generally discloses a central server for enabling user upload of content such as files containing audio, video, graphical, data, points of interest, and other information from a user device such as a personal computer to the central server over the internet. Upon determining that a trigger event has occurred, communication and processing circuitry in a vehicle device automatically download the previously uploaded content over the internet and a short-range wireless network and store the content for use by a device such as an audio/visual/navigation unit. Examples of a trigger event include proximity to a short-range wireless communication network coupled to the internet, presence within a geofence, turning off a vehicle's engine, or detecting an SMS wake-up message while the vehicle device's main processor, transceivers not used for SMS, and auxiliary circuitry are in sleep mode. The short-range wireless network can be a vehicle owner's home network, or a commercial Wi-Fi hot spot, or subscription wireless service.

U.S. Patent Application 2014/091903 generally discloses a system and method for determining a first proximity status of a first mobile device with respect to a vehicle, and determining a second proximity status of a second mobile device with respect to the vehicle. Additionally, an accessibility of one or more functions of the vehicle may be configured based at least in part on the first proximity status and the second proximity status. In one example, a policy associated with one or more of the first mobile device and the second mobile device may be identified, wherein the accessibility is configured further based on the policy.

U.S. Patent Application 2008/082221 generally discloses a system and method to extract, monitor, analyze, and send data from a vehicle interface module (VIM) coupled to one or more vehicular electronic devices. The system and method may transmit vehicle and geographic location data to a handheld device and forward the data to a web server over a wide area network. The system and method may publish the data for viewing by end users or for programmatic access by software applications.

SUMMARY

In at least one embodiment, a vehicle key base station comprising at least one controller communicating with a key fob and a nomadic device via one or more transceivers. The at least one controller configured to receive a security code request from the nomadic device. The at least one controller may be further configured to verify the nomadic device is approved to communicate with a vehicle key. If the nomadic device is approved, the at least one controller may be further configured to transmit a request to the key fob for a vehicle security code and receive the vehicle security code from the key fob. The at least one controller may be further configured to transmit the vehicle security code to the nomadic device.

In at least one embodiment, a vehicle computing system comprising a key fob base station and at least one processor. The at least one processor in communication with the key fob base station and a transceiver. The at least one processor may be configured to receive a security code request from the nomadic device via the transceiver. The at least one controller may be further configured to verify that the device is approved to communicate with a key fob at the key fob base station. If the nomadic device is approved, the at least one controller may be further configured to transmit the security codes to the nomadic device. The at least one controller may be further configured to receive one or more key fob functions from the nomadic device mimicking the key fob. The at least one processor may be further configured to authenticate the codes to enable communication with the nomadic device and enable a key fob function if authentication is approved.

In at least one embodiment, a computer-implemented product including instructions embodied in a non-transitory computer readable medium that, when executed by a processor, cause the processor to establish communication with a key fob base station. The computer-implemented product may include further instructions embodied in a non-transitory computer readable medium to cause the processor to transmit a request for security data from a key fob via the key fob base station and receive the security data. The computer-implemented product may include further instructions to cause the processor to transmit a key fob function to a vehicle computing system based on the key fob security data in response to input via user interface.

DETAILED DESCRIPTION

Figure 1:
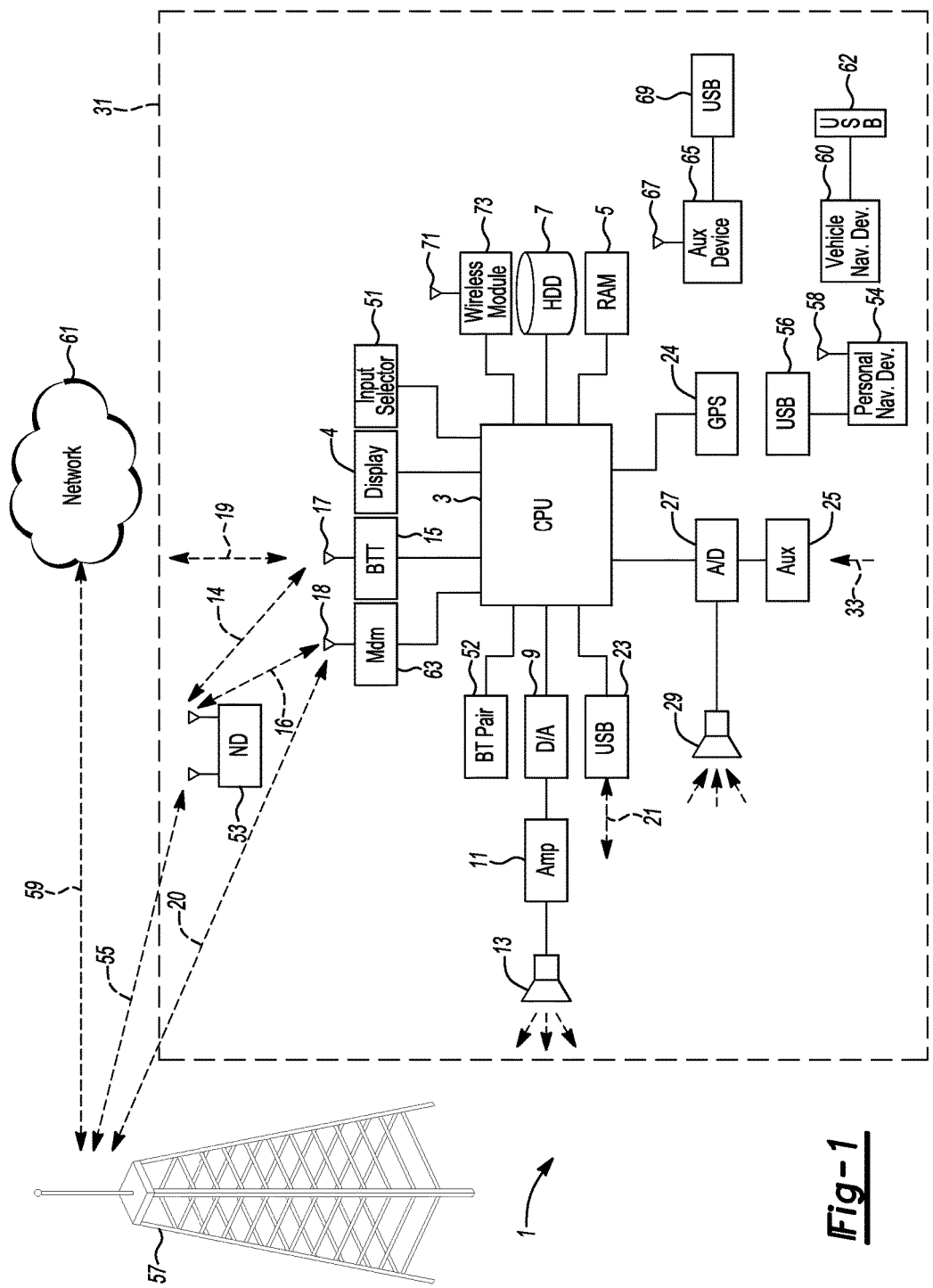
FIG. 1 an exemplary block topology of a vehicle infotainment system implementing a user-interactive vehicle information display system according to an embodiment.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The embodiments of the present disclosure generally provide for a plurality of circuits or other electrical devices. All references to the circuits and other electrical devices and the functionality provided by each, are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electric devices may be configured to execute a computer-program that is embodied in a non-transitory computer readable medium that is programmed to perform any number of the functions as disclosed.

This invention disclosure proposes a key fob base station at a physical location such as the user's home. The base station may receive a key fob and wirelessly communicate the key fob security codes to a nomadic device via a computer network (e.g., server). The key fob base station may transmit the information and data to mimic the key fob (RF frequency, key, etc.) to the server. The server may transmit the information and data to one or more pre-registered nomadic devices (i.e., smartphones). The smartphone using a wireless transmitter may receive the data from the server and gain access to a vehicle by communicating the data to a vehicle computing system. The key fob base station may also be used to control user access to the vehicle by assigning one or more smartphones to receive the key fob information and data (e.g., pre-registration of the smartphone at the base station).

This disclosure enables a vehicle key fob to be inserted into the base station for enabling control of one or more key fob functions for a particular vehicle using the nomadic device (i.e., smartphone). The base station may be configured by a user to enable communication between the key fob and one or more nomadic devices via the server connection. If the key fob is removed from the base station, the nomadic device in communication with the base station may receive a remedial action message. The remedial action message may be communicated to the vehicle computing system via the nomadic device. The remedial action may output a warning message, may deny access to the vehicle via the nomadic device, put the powertrain system of the vehicle in a shutdown mode, and/or transmit a reduce engine power command to the powertrain system.

FIG. 1 illustrates an example block topology for a vehicle based computing system 1 (VCS) for the vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, spoken dialog system with automatic speech recognition and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smartphone, PDA, or any other device having wireless remote network connectivity). The nomadic device 53 may then be used to communicate 59 with a network 61 outside the vehicle 31 through, for example, communication 55 with a cellular tower 57. In some embodiments, tower 57 may be a WiFi access point.

Exemplary communication between the nomadic device 53 and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that may be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. These are all ITU IMT-2000 (3G) compliant standards and offer data rates up to 2 mbs for stationary or walking users and 385 kbs for users in a moving vehicle. 3G standards are now being replaced by IMT-Advanced (4G) which offers 100 mbs for users in a vehicle and 1 gbs for stationary users. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a WiFi (IEEE 803.11) 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing the process, since the wireless device would not "send and receive" information with itself. One of ordinary skill in the art will understand when it is inappropriate to apply a particular VACS to a given solution. In all solutions, it is contemplated that at least the vehicle computing system (VCS) located within the vehicle itself is capable of performing the exemplary processes.

Figure 2:
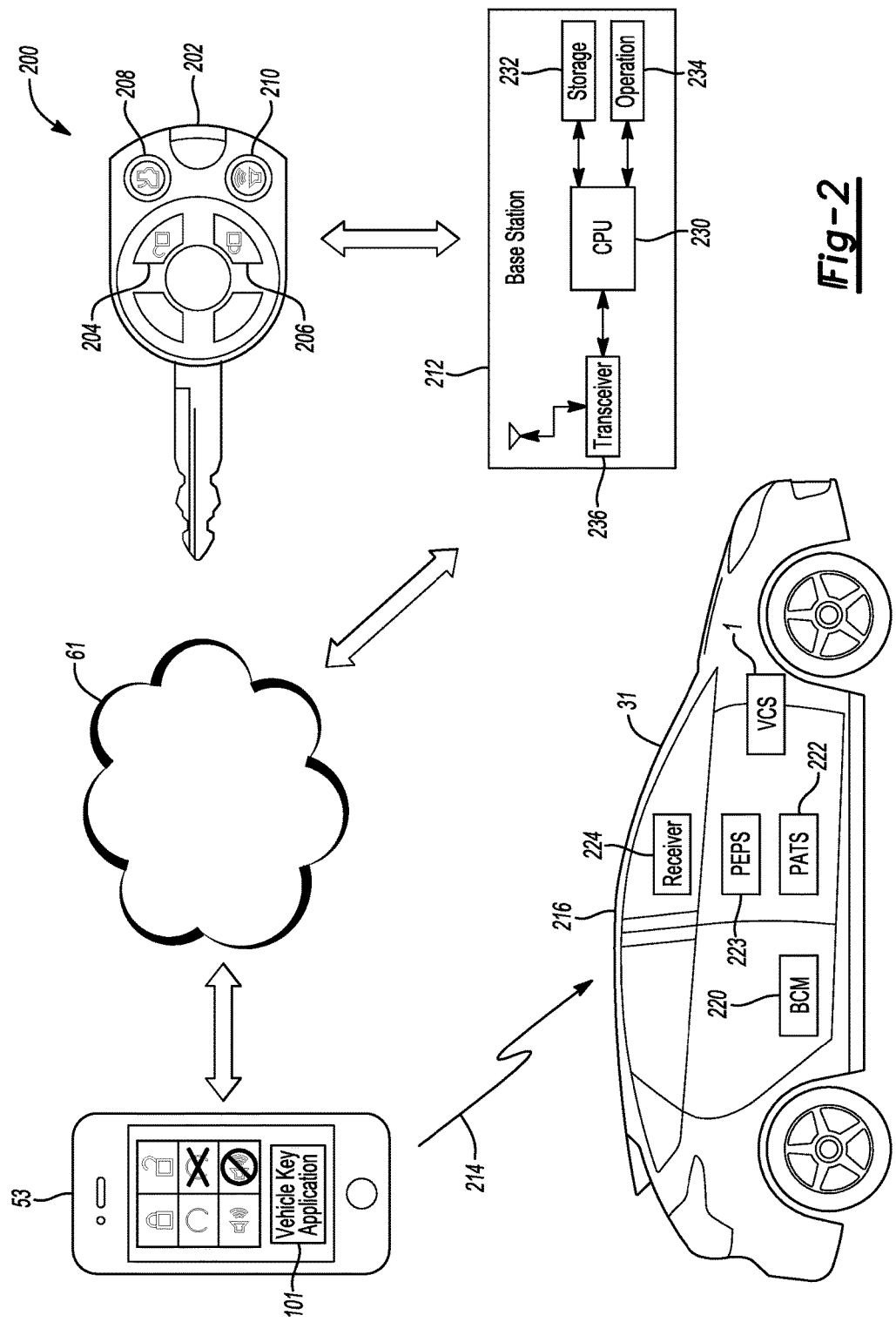
FIG. 2 is an exemplary block topology of a key fob base station system implementing vehicle security codes to a nomadic device according to an embodiment.

FIG. 2 is an exemplary block topology of a key fob base station system 200 implementing vehicle security codes to the nomadic device 53 according to an embodiment. The key fob base station 212 enables the nomadic device 53 to transmit key fob messages to the VCS 1. The key fob base station 212 communicates with the nomadic device 53 via the server 61. The key fob base station 212 may communicate with a key fob 202 using short range wireless technologies.

The key fob base station 212 may include, but is not limited to, a central processing unit (CPU) 230, memory storage 232, an operating system 234, and one or more transceivers 236. The key fob base station 212 may comprise hardware (e.g., CPU 230) for executing software to establish communication with the key fob 202 and the nomadic device 53. The software at the key fob base station 212 may enable the communication of one or more vehicle security codes and command functions to the nomadic device 53 such that the nomadic device 53 may mimic the key fob 202. For example, the key fob base station system 200 may transmit key fob functions to a preregistered nomadic device 53 including, but not limited to, unlocking the door, a trunk opening request, an enabling an alarm, and starting the vehicle. The key fob base station may be located remotely from the VCS 1 and/or embedded with the VCS 1.

The nomadic device 53 may comprise a processor that includes a device integration framework (i.e., a key fob application 101) configured to provide various services to the device. These services may include transmitting messages between the nomadic devices 53 and the VCS 1, transport routing of messages with the key fob base station 212, and/or a combination thereof. For example, the device integration framework 101 may enable the nomadic device 53 to mimic as the key fob 202 by transmitting commands to the vehicle 31 based on an established communication with the key fob base station 212. The various operations that are capable of being controlled by the nomadic device 53 operating as a key fob 202 may include, but is not limited to, entering the vehicle, exiting the vehicle, starting the vehicle, and/or opening the trunk.

The VCS 1 may include the interface display 4, a body electronics controller 220, passive entry passive start (PEPS) controller 223, a passive anti-theft security (PATS) controller 222, and a receiver 216. The PEPS 223 function is a keyless access and start system controller, and may be used in combination with or in place of the PATS controller 222. With the PEPS controller 223, the user is not required to use a mechanical key blade to open the door of the vehicle or to start the vehicle 31. The key fob 202 may include a mechanical key to ensure that the driver can access and start the vehicle in the event the key fob 202, VCS 1, and/or nomadic device 53 exhibit low battery power. The key fob 202 or nomadic device 53 each include an ignition key device and/or application 101 embedded within for communicating with the PEPS controller 223. In one example, the transponder of the key fob 202 and/or nomadic device 53 may be adapted to send the key number and encrypted data on a signal KEY_ID as an RF signal to the PEPS controller 223. In another example, the nomadic device 53 may transmit the signal KEY_ID to the PEPS controller 223 using WiFi, near field communication, and/or Bluetooth. To gain access or entry into the vehicle 31 with the key fob 202 and/or nomadic device 53, the user may need to wake up the PEPS controller 223 to establish bi-directional communication between the key fob 202 or nomadic device 53 and the PEPS controller 223. In one example, the VCS 1 may not require the wake up request by implementing a low voltage wireless communication system (e.g., Bluetooth Low Energy) waiting to receive a communication request from the nomadic device 53. In another example, such a wake up may occur by requiring the driver to touch and/or pull the door handle of the vehicle 31. In response to the door handle being toggled or touched, the PEPS controller 223 may wake up and transmit a wireless based signal (e.g., RF, Bluetooth, WiFi, etc.) to the key fob 202 or nomadic device 53. The PEPS controller 223 and the key fob 202 or nomadic device 53 may undergo a series of communications back and forth to each other (e.g., security handshaking) for vehicle access authentication purposes. The PEPS controller 223 may unlock the doors in response to a successful completion of the handshaking process. Once the driver is in the vehicle 31, the driver may simply press a button positioned on an instrument panel to start the vehicle 31.

The VCS 1 may transmit key fob application 101 messages to the vehicle interface display 4. The interface display 4 may be implemented as a message center on an instrument cluster or as a touch screen monitor such that each nomadic device 53, once paired, may transmit text, menu options, status or other such inquiries to the driver in a visual format. A driver may scroll through the various fields of text and select menu options via at least one switch (not shown) positioned about the interface display. The switch may be remotely positioned from the interface display 4 or positioned directly on the interface display 4. The vehicle interface display 4 may be any such device that is generally situated to provide information and receive feedback to/from a vehicle occupant. The switches may be in the form of voice commands, touch screen, and/or other such external devices (e.g., phones, computers, etc.) that are generally configured to communicate with the electrical system (i.e., VCS 1) of the vehicle 31.

The interface display 4, the PEPS controller 223, the PATS controller 222, and the body electronics controller 220 may communicate with each other via a multiplexed data link communication bus (or multiplexed bus). The multiplexed bus may be implemented as a High/Medium Speed Controller Area Network (CAN) bus, a Local Interconnect Network (LIN), or any such suitable data link communication bus generally situated to facilitate data transfer between controllers (or modules) in the vehicle 31.

The body electronics controller 220 generally controls a portion or all of the electrical content in an interior section of the vehicle 31. In one example, the body electronics controller 220 may be a smart power distribution junction box (SPDJB) controller. The SPDJB controller may include a plurality of fuses, relays, and various micro-controllers for performing any number of functions related to the operation of interior and/or exterior electrically based vehicle functionality. Such functions may include but are not limited to electronic unlocking/locking (via interior door lock/unlock switches), remote keyless entry operation, vehicle lighting (interior and/or exterior), electronic power windows, and/or key ignition status (e.g., Off, Run, Start, Accessory (ACCY)).

An ignition switch (not shown) may be operably coupled to the body electronics controller 220. The body electronics controller 220 may receive hardwired signals indicative of the position of the ignition switch and transmit multiplexed messages on the multiplexed bus that are indicative of the position of the ignition switch. For example, the body electronics controller 220 may transmit a signal IGN_SW_STS (e.g., whether the ignition is in the OFF, Run, Start, or Accessory (ACCY) positions) over the multiplexed bus to the vehicle interface display 4. The signal IGN_SW_STS generally corresponds to the position of the ignition switch (e.g., Off, Run, Start, or Accessory positions). The ignition switch may be configured to receive key fob security messages (i.e., security handshakes) via the nomadic device 53 to start the vehicle 31.

The key fob 202 comprises a transponder (not shown). The transponder includes an integrated circuit and an antenna. The transponder is adapted to transmit a signal KEY_ID in the form of a wireless signal (e.g., radio frequency) to the PATS controller 222. For example, the signal KEY_ID generally comprises RF data that corresponds to a manufacturer code, a corresponding key fob serial number and encrypted data. The key fob serial number and the encrypted data are used to authorize the engine controller to start the vehicle in the event the encrypted data corresponds to predetermined encrypted data stored in a look up table (LUT) of the PATS controller 222. The PATS controller 222 may use the key fob identifier and/or the encrypted data transmitted on the signal KEY_ID to determine if the key fob is approved to communicate with the VCS 1. The manufacturer code generally corresponds to who the manufacturer of the vehicle is. For example, the manufacturer code may correspond to Ford Motor Company. Such a code prevents the user (or technician) from mistakenly configuring a key with a manufacturer code of another vehicle manufacturer to a Ford vehicle. An example of a LUT that may be stored in the PATS controller 222 is shown in TABLE 1 directly below.

TABLE 1

| KEY SERIAL # | MAN. CODE | ENCRYPTED DATA | TYPE |
|---|---|---|---|
| 1xxA | Ford | #$#$#$#$#$#$#$# | Nomadic Device #1 |
| 2xxB | Ford | #######$$$$$$$$ | Nomadic Device #2 |
| 3xxC | Ford | $#$#$#$#$#$#$#$ | Nomadic Device #3 |
| NnnN | Ford | $$$$$$$######## | Nomadic Device #4 |

The LUT may include any number of key fobs 202. To start the vehicle, the PATS controller 222 decodes the key serial number, the manufacturing code, and corresponding encrypted data received on the signal KEY_ID and compares such data to the key serial number and the encrypted data in the LUT to determine whether such data match prior to starting the vehicle for anti-theft purposes. In the event the data matches, the engine controller operably coupled to the PATS controller 222 allows the vehicle to start the engine.

In another embodiment, the nomadic device 53 may be configured using a software application 101 to communicate with the VCS 1 and/or PATS Controller 222 via the key fob base station 212. The key fob base station 212 may recognize the nomadic device 53 is either an approved or disapproved key holder. The nomadic device may be recognized by the VCS 1 based on the communication with the key fob base station 212. The nomadic device may receive the signal KEY_ID from the key fob based on a wireless communication with the key fob base station 212. The nomadic device 53 may include a transceiver to transmit the signal KEY_ID to the VCS 1 (e.g., PATS controller 222, PEPS controller 223, and/or a combination thereof) using wireless communication including, but not limited to, Bluetooth technology, WiFi, cellular communication. An example of a LUT that may be stored in the PATS controller 222 as shown in TABLE 2 directly below.

TABLE 2

| KEY SERIAL # | MAN. CODE | ENCRYPTED DATA | PAIRED MOBILE DEVICE TYPE |
|---|---|---|---|
| 1xxA | Ford | #$#$#$#$#$#$#$# | Primary |
| 2xxB | Ford | #######$$$$$$$$ | Secondary |
| 3xxC | Ford | $#$#$#$#$#$#$#$ | Secondary |
| NnnN | Ford | $$$$$$$######## | Primary |

The LUT that is stored in the PATS controller 22 may enable the nomadic device to be assigned as a primary or secondary user. The key fob base station 212 may assign the nomadic device 53 as a primary or secondary user. For example, if the nomadic device 53 is assigned as a primary user, the encrypted data transmitted to the nomadic device 53 may enable all functions and features of the VCS 1. If the nomadic device 53 is assigned as a secondary user at the key fob base station 212, the nomadic device 53 may have restrictions on features and functions of the VCS 1. For example, if the nomadic device 53 is sent encrypted data identifying the device as a secondary user, the VCS 1 may limit speed of the vehicle 31, limit volume control of the radio, and/or limit use of cellular phone activity while the vehicle 31 is moving. In another embodiment, the key fob 202 may be assigned a primary or secondary key fob 202; therefore the encrypted data may be transmitted as a primary or secondary user based on the key fob 202 at the vehicle key base station 212.

In another example, the nomadic device 53 may execute the software application 101 running on hardware at the device to transmit a keyless operation request to the key fob base station 212. The key fob base station 202 may determine if the key fob 202 is present and available for communication with the nomadic device 53. The key fob base station 212 may be pre-configured to approve one or more nomadic devices 53 to communicate with the key fob 202. If the nomadic device 53 is approved to communicate with the key fob base station 212, the key fob 202 may transmit the key serial number, the manufacturing code, and corresponding encrypted data to the device 53. The nomadic device may transmit the key serial number, the manufacturing code, and corresponding encrypted data to the VCS 1 via a wireless connection.

In one example, the nomadic device 53 may use an onboard modem with antenna to wirelessly communicate with the VCS 1. In another example, the nomadic device 53 may use short range wireless technology including, but not limited to, Bluetooth, Near Field Communication, and/or MiFi.

The PATS controller 222 and/or VCS 1 may recognize the nomadic device 53 based on a wireless message comprising the key serial number, manufacturing code in combination with the key fob 202 transmitted encrypted data (i.e., KEY_ID). The PATS 222 and/or VCS 1 may recognize the nomadic device 53 from the received KEY_ID signal using the one or more wireless communication technologies.

For example, the nomadic device 53 may transmit the KEY_ID signal directly to the PATS controller 222 using a key fob application 101 executed on hardware of the device. In another example, the nomadic device 53 may transmit a short range wireless communication (e.g., radio frequency identification) to the VCS 1, PEPS controller 223, PATS controller 222, or combination thereof. The nomadic device 53 may transmit a message to the key fob base station 212 to request remote keyless entry operations. The key fob base station may determine if the nomadic device is approved to receive the security handshake data (i.e., signal KEY_ID) from the key fob 202. If the nomadic device 53 is approved to receive the information from the key fob 202, the key fob base station 212 may transmit the data to the nomadic device 53. The nomadic device 53 may communicate with the VCS 1 using the ignition key application 101 allowing the VCS 1 to recognize a keyless entry operation. The VCS 1 may determine based on the encrypted data received from the nomadic device 53 if the one or more operations are approved to be executed at the one or more vehicle systems.

Prior to starting the vehicle, the nomadic device may transmit the key fob serial number and the encrypted data to the VCS 1, which are then compared to known key fob numbers and/or encrypted data in a PEPS look up table in a manner similar to that described above. The manufacturing code is also checked to ensure the nomadic device 53 information received from the key fob 202 is used for a particular manufacturer of the vehicle 31. The PEPS LUT may be similar to the PATS LUT as shown in Table 1 and Table 2. As noted above, additional operations are performed as exhibited with the handshaking exercise in addition to matching the data received on the signal KEY_ID with the data in the LUT (e.g., key serial number and encryption data) to ensure that the user is properly authorized to enter the vehicle and to start the vehicle with the PEPS implementation.

The key fob base station 212 may comprise an interface display to allow for input from a user to pre-register one or more nomadic devices. The key fob base station 212 provides a slot for a user to place the key fob 202 that is to be broadcasted out to one or more nomadic devices 53. It is generally contemplated that the slot may be coupled directly to the interface display. The key fob base station 212 may transmit the signals IGN_SW_STS, and KEY_STATUS received from the key fob 202 over a wireless communication connection to the nomadic device 53.

In general, the key fob base station 212 may update the value under the 'TYPE' heading of Table 1 and/or Table 2 for a particular key and related nomadic device 53 for an approved user or a restricted user. The 'TYPE' may be determine in response to the user configuring the base station via the interface display by assigning nomadic devices as an approve user or a restricted user.

Figure 3:
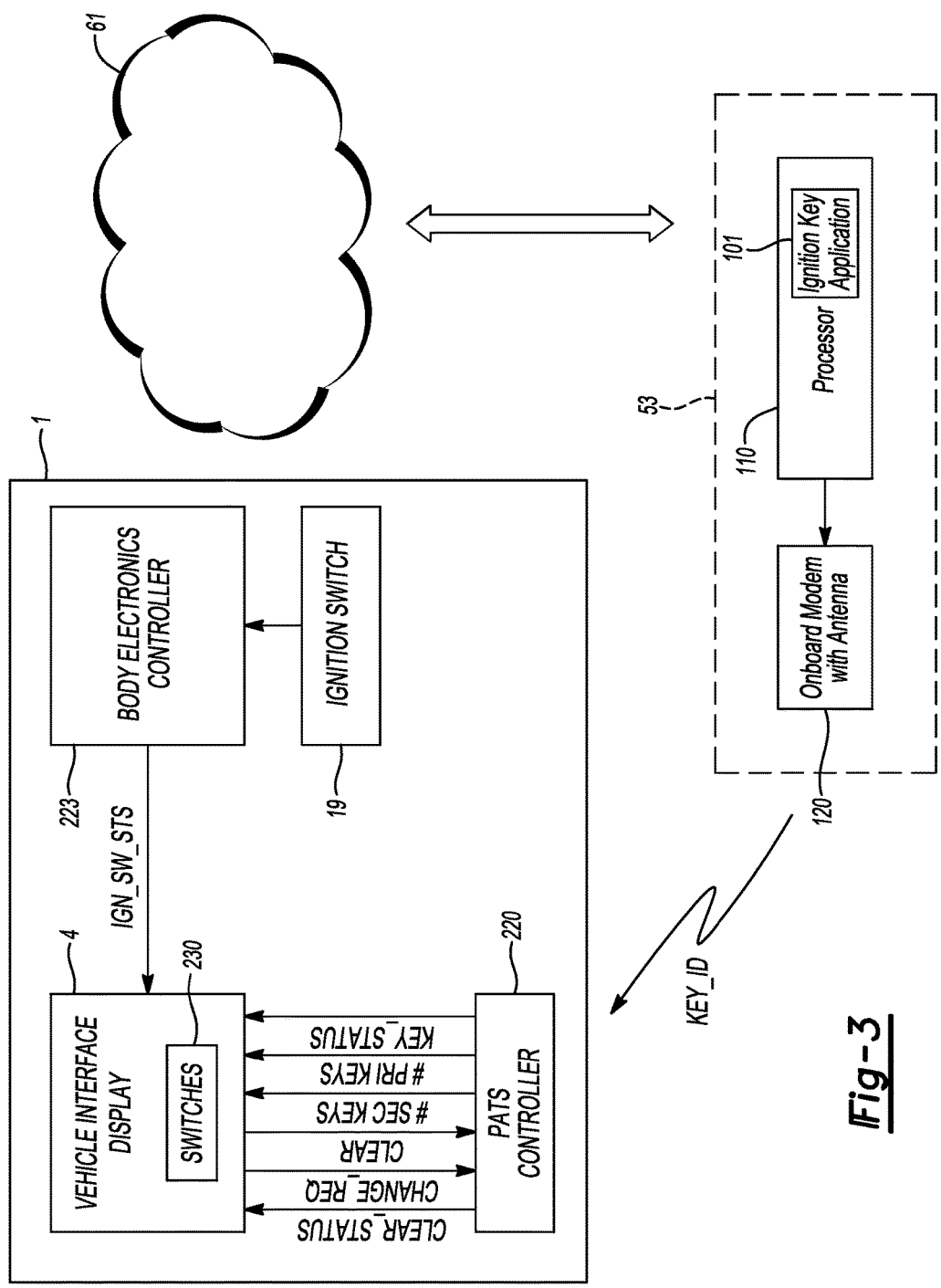
FIG. 3 is an exemplary block topology of a nomadic device in communication with a vehicle computing system according to an embodiment.

FIG. 3 is an exemplary block topology of the nomadic device 53 in communication with the vehicle computing system 1 according to an embodiment. The nomadic device 53 may be in communication with the key fob base station 212 via a server 61. The nomadic device 53 may comprise at least one processor 110 configured to execute the ignition key application 101. The nomadic device 53 may comprise an onboard modem with antenna 120 capable of communicating with the server 61, the VCS 1, and/or a combination thereof. In other embodiments, the nomadic device 53 may communicate with the server and/or VCS 1 using other wireless communication technology.

The nomadic device 53 may receive the signal KEY_ID from the key fob 202 via the base station 212 communicating with the server 61. The nomadic device 53 may transmit the signal KEY_ID to the VCS 1. The VCS 1 may receive the signal KEY_ID and execute the requested keyless entry operation being transmitted by the nomadic device 53.

For example, the nomadic device 53 may receive a request to unlock the vehicle doors. The nomadic device 53 may transmit that request to the key fob base station 212 via a wireless communication network. The key fob base station 212 may receive the request and determine if the nomadic device 53 is authorized to communicate with the key fob 202. If approved, the base station 212 may transmit a request to the key fob 202 requesting to receive the RF data comprising the unlock data necessary for the related vehicle. The key fob base station 212 may transmit the unlock request data to the nomadic device 53. The nomadic device 53 may transmit the unlock request data to the VCS 1.

In another example, the nomadic device 53 may request to start the vehicle 31 via a keyless push button ignition switch 19. The VCS 1 may require additional security data from the key fob 202 via the nomadic device 53 before enabling the start request. The nomadic device 53 may select a start request at the ignition key application 101. The ignition key application 101 may generate a message using the hardware at the nomadic device 53 to transmit the start request to the key fob base station 212 via the wireless communication. The key fob base station 212 may receive the request and determine if the nomadic device is approved to start the vehicle. If approved, the base station 212 may transmit a request to the key fob 202 requesting to receive the RF data comprising the start data necessary for the related vehicle 31. The key fob base station 212 may transmit the start request data to the nomadic device 53. The nomadic device 53 may transmit the start request data to the VCS 1 to enable the keyless push button ignition switch 19.

Figure 4:
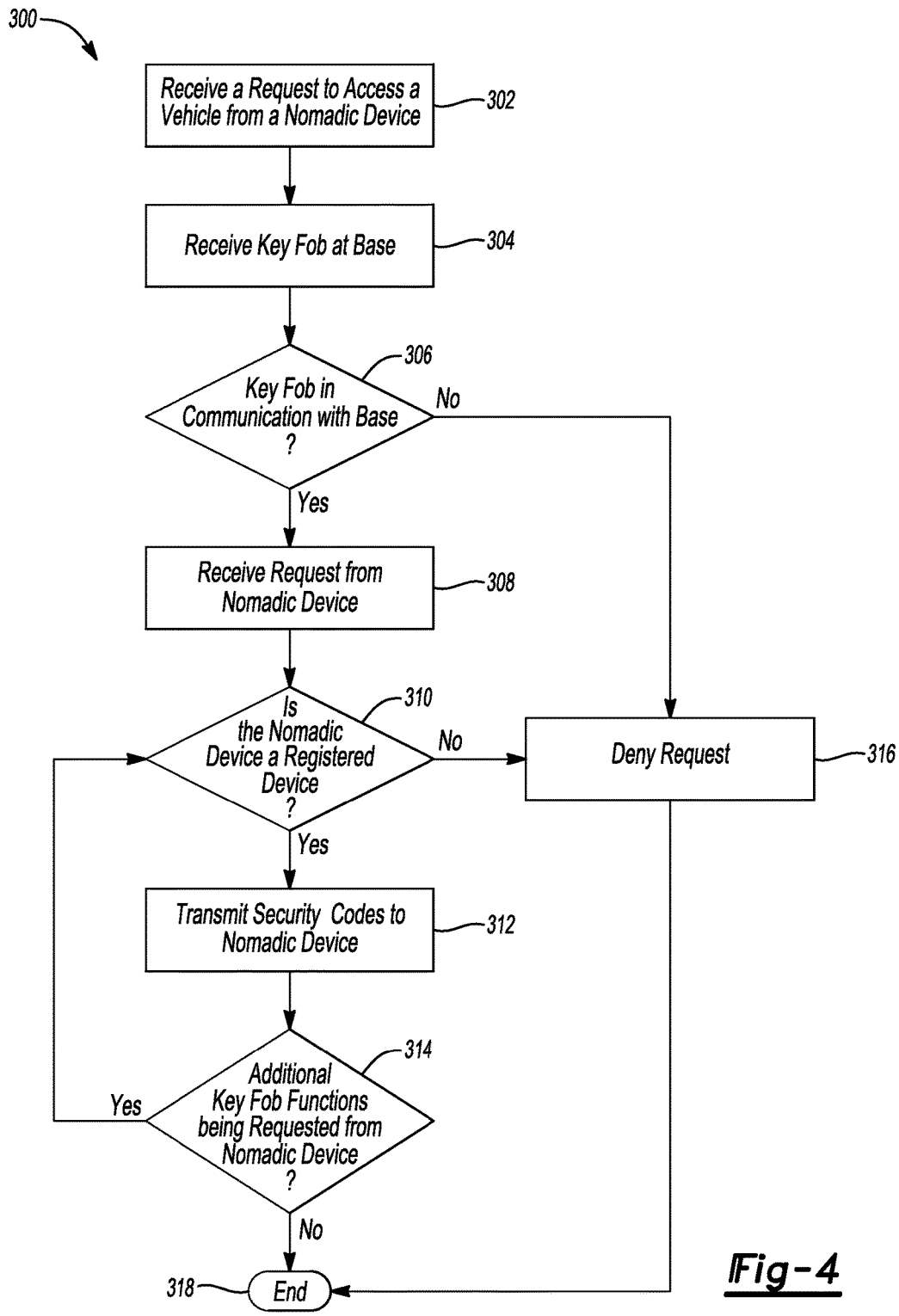
FIG. 4 is a flow chart of a key fob base station system according to an embodiment.

FIG. 4 is a flow chart of a key fob base station method 300 of communicating key fob functions to the nomadic device according to an embodiment. The method 300 may be implemented using software code contained within the key fob base station. In other embodiments, the method 300 may be implemented in a controller at the server in communication with the key fob base station, a controller located at the key fob base station, or a combination thereof.

Referring again to FIG. 4, the key fob base station, key fob, nomadic device, vehicle computing system, and its components illustrated in FIG. 1, FIG. 2, and FIG. 3 are referenced throughout the discussion of the method 300 to facilitate understanding of various aspects of the present disclosure. The method 300 of recognizing compatible feature/function/service applications while communicating with one or more devices may be implemented through a computer algorithm, machine executable code, or software instructions programmed into a suitable programmable logic device(s) of the key fob base station, such as the base station control module, the nomadic device control module, the vehicle computing system, or a combination thereof. Although the various operations shown in the flowchart diagram 300 appear to occur in a chronological sequence, at least some of the operations may occur in a different order, and some operations may be performed concurrently or not at all.

In operation 302, the key fob base station (also known as the base station) may receive a request to access a vehicle (i.e., unlock doors, open trunk, start powertrain, etc.) from a nomadic device. The base station may be configured to receive a key fob for communicating vehicle security data with one or more nomadic devices in operation 304.

For example, the base station may have a slot holder and/or some sort of mechanical structure to hold the key fob. The base station may have a setup process to enable the base station system to communicate with the key fob. The setup process may include an initial communication synchronization process so that the base station and key fob may be paired. The setup process may also include the registration of one or more nomadic devices. For example, the base station may have one or more predefined tables registering a nomadic device as an authorized user for a specific key fob. The one or more predefined table may be configured at the base station using a user interface display and/or at a remote computing device in communication with the base station.

In another example, the key fob base station may be used by a family having several drivers for one vehicle. Instead of making multiple copies of the key and/or getting multiple key fobs, the base station may be used to communicate the key fob security handshake data to one or more authorized nomadic devices that are assigned to an authorized user (e.g., family, friend, renter, etc.). The base station may also be used by a car sharing service to transmit one or more key fob functions to an authorized non-owner (e.g., renter) of the vehicle.

In operation 306, the base station may determine if communication has been established with the key fob. If communication has not been established, the base station may request a key fob be placed at or near the base station to establish communication. If the key fob is not placed at the base station a deny request message is sent to the nomadic device in operation 316.

In operation 308, the base station may receive a request from a nomadic device to begin communication with the key fob. For example, a smartphone may transmit a request to the base station for an 'unlock key function' to unlock the vehicle. The base station may determine if the nomadic device requesting communication is a registered and/or an approved device in operation 310.

In operation 312, if the nomadic device is an approved device, the base station may transmit a request to receive the one or more key fob function messages from the key fob and transmit the message(s) to the nomadic device. The nomadic device may continue to request additional key fob functions to the base station in operation 314. The base station may continuously check to determine if the nomadic device is still authorized to receive the key fob function messages.

For example, if a user of a particular nomadic device has one or more restrictions associated with the use of the vehicle, the base station may transmit one or more warning message to the nomadic device. The one or more warning may include, but is not limited to, elimination of key functions, remedial action, and/or a combination thereof. In one example, the once approved nomadic device may have missed a curfew to return the vehicle; therefore the base station may eliminate the communication of the key fob function messages to the nomadic device in operation 316. In another example, a user of the vehicle having an approved nomadic device is currently driving the vehicle and violating one or more restrictions, the base station may send a remedial action message to the VCS via the nomadic device. The remedial action message may include the following instruction executed by the VSC, reduce powertrain power, shutting down the powertrain, and/or a combination of both.

In operation 318, the base station may end communication with the key fob based on the removal of the key fob from the base station. In another example, the base station may end communication with the nomadic device based on the preconfigured table and/or a request from the operator of the base station.

Figure 5:
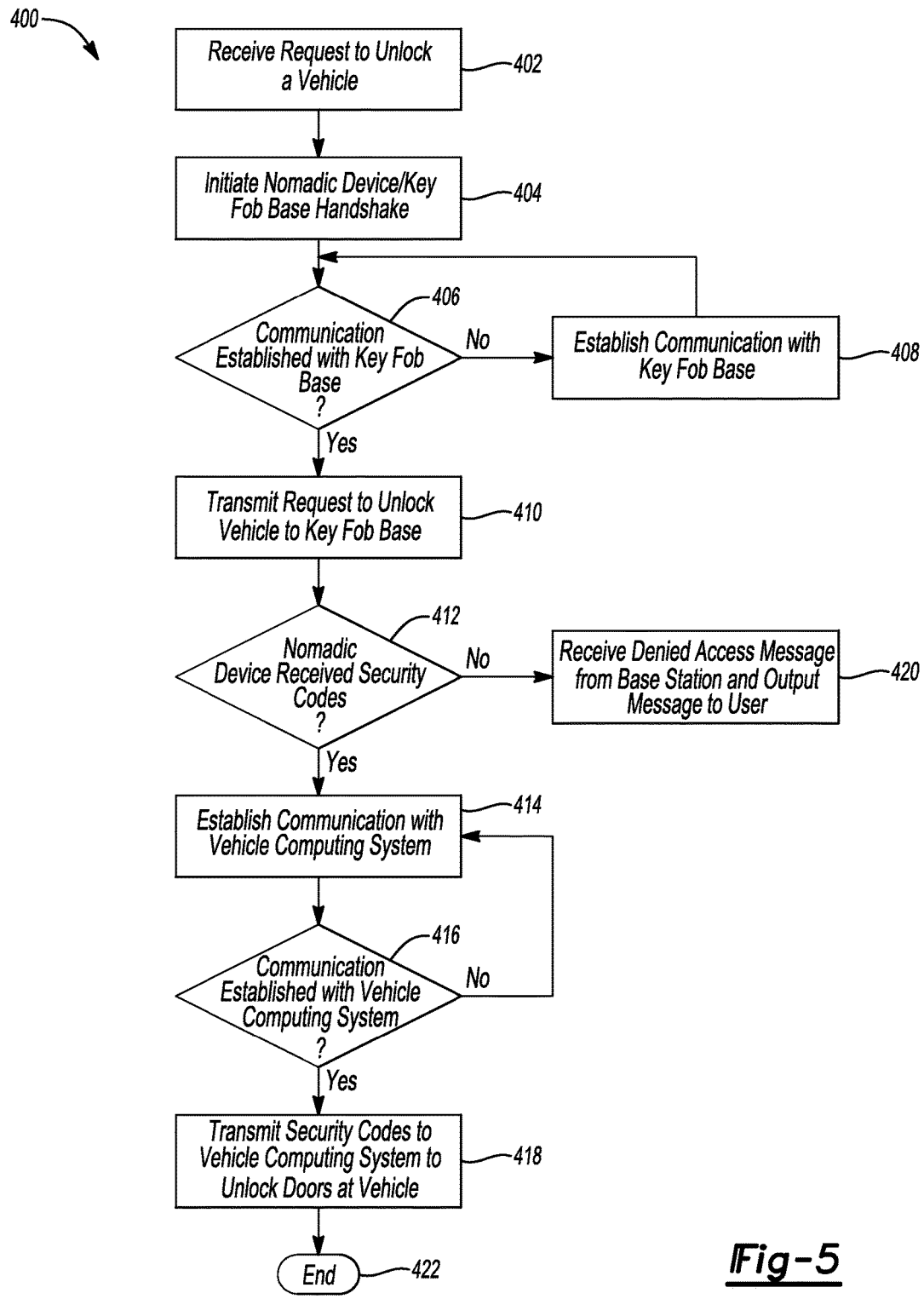
FIG. 5 is a flow chart of the nomadic device in communication with the key fob base station according to an embodiment.

FIG. 5 is a flow chart of the nomadic device in communication with the key fob base station. The method 400 may be implemented using software code contained within the key fob base station. In other embodiments, the method 300 may be implemented in a controller at the server in communication with the base station, a controller at the nomadic device, a controller located at the base station, or a combination thereof.

In operation 402, the nomadic device may execute one or more algorithms at the hardware of the device to receive a request to unlock door of a vehicle. In response to a key fob function request (i.e., unlock door), the nomadic device may initiate communication with the base station in operation 404.

For example, the nomadic device may execute a key fob application (e.g., the ignition key application) on hardware of the device. The application may output a display mimicking the key fob functions (e.g., unlock, lock, start, open trunk, etc.). The display may receive input from a user selecting the key fob function.

In operation 406, the nomadic device may determine if communication with the base station has been established. If communication with the base station is not established, the nomadic device may request communication with the base station in operation 408. The communication between the base station and the nomadic device may require one or more settings to be configured at the key fob application being executed at the device.

In operation 410, once communication has been established with the base station, the nomadic device may transmit a key fob function (e.g., unlock request) selected by a user. The nomadic device may receive the requested key fob function data from the base station in operation 412. If the base station determines that the nomadic device is no longer authorized to communicate with the key fob and/or the key fob has been removed from the base station, the nomadic device may receive a denied access message. The nomadic device may receive and output the denied access message to the user in operation 420.

In operation 414, once the nomadic device receives the key fob function data from the base station, the nomadic device may establish communication with the VCS. The communication between the nomadic device and VCS may include a security handshake process that includes the key fob security codes received from the key fob via the base station. The nomadic device may determine if communication with the VCS has been established in operation 416.

In operation 418, after the security handshake, the nomadic device may transmit the key fob function selected by the user to the VCS. For example, if the user selects an unlock command at the user interface of the nomadic device, the unlock message is transmitted to the VCS via short range communication technology. The nomadic device may end communication with the VCS and/or base station if the key fob application is disabled or if the nomadic device is requested to power down in operation 422.

Figure 6:
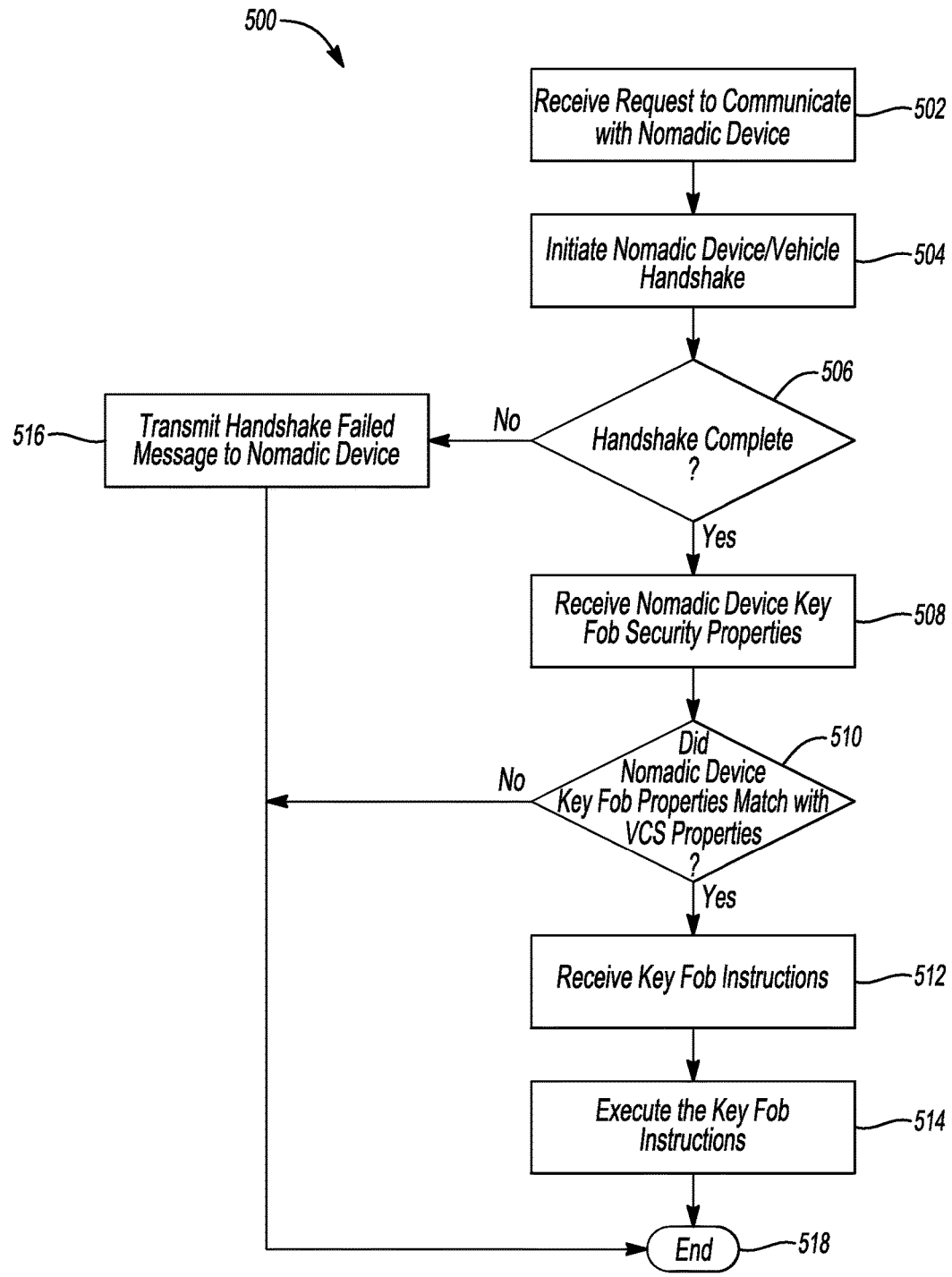
FIG. 6 is a flow chart of the vehicle computing system in communication with the key fob base station via the nomadic device according to an embodiment.

FIG. 6 is a flow chart of a VCS in communication with the key fob base station via the nomadic device. The method 500 may be implemented using software code contained within the VCS. In other embodiments, the method 500 may be implemented in one or more controllers at the VCS, a controller in communication with the VCS, or a combination thereof.

In operation 502, the VCS may receive a request to communicate with the nomadic device. The VCS may begin to initiate the security handshake process with the nomadic device in operation 504. For example, the VCS may receive the security handshake from the base station via the nomadic device.

In operation 506, the VCS may determine if the security handshake is acceptable and/or complete. If the VCS detects an error during the security handshake process, the VCS may transmit an error message to the nomadic device in operation 516. The error message may include an unauthorized access message notifying the user at the nomadic device of their denied access to the vehicle. In other examples, the error messages may be customized to include personal message for an identified user.

In operation 508, the VCS may approve the security handshake, and enable the system to receive key fob security properties. The VCS may determine if the key fob properties received from the nomadic device matches with the VCS function properties in operation 510.

For example, the VCS may receive the key fob serial number and the encrypted data used to authorize one or more key fob instructions from the nomadic device. In one example, the key fob serial number and the encrypted data may authorize the engine controller to start the vehicle in the event the encrypted data corresponds to predetermined encrypted data stored in the LUT of the VCS (e.g., PATS controller).

In operation 512, the VCS may receive key fob instruction from the key fob via the nomadic device in communication with the base station. The VCS may execute the key fob instructions/commands received from the nomadic device in operation 514.

In operation 518, the VCS may monitor to see if a disable request has been requested. If no disable request has been received, the VCS may continue to communicate with the nomadic device to receive key fob instructions. The VCS may end communication with the nomadic device if the system is disabled or is being requested to power down.

While exemplary embodiments are described above, it is not intended that these embodiments describe all possible forms encompassed by the claims. The words used in the specification are words of description rather than limitation, and it is understood that various changes can be made without departing from the spirit and scope of the disclosure.

As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A system comprising:
a base station, remote from a vehicle, including a controller programmed to:
wirelessly communicate with a nomadic device and a key fob paired to the vehicle;
receive a security code request from the nomadic device to access the vehicle; and
if the key fob is at the base station and the nomadic device is approved, transmit a security code obtained from the key fob to the nomadic device over a wide-area network.

2. The base station of claim 1, wherein the security code is an encrypted message having at least one of a manufacturer code, a corresponding key fob serial number, and encrypted data.

3. The base station of claim 2, wherein the nomadic device transmits the security code to a vehicle computing system of the vehicle to enable a key fob function including at least one of an unlock request, an ignition start request, a trunk open request, an enable alarm request, a disable alarm request, or a lock request.

4. The base station of claim 3, wherein the nomadic device transmits the ignition start request to the vehicle computing system to start a powertrain system of the vehicle via the security codes.

5. The base station of claim 1, wherein the nomadic device is approved to communicate with the key fob based on a pre-registration configuration.

6. The base station of claim 5, wherein the pre-registration configuration includes a list of an authorized user based on at least one of a mobile telephone number, a password, and an electronic mail address.

7. The base station of claim 1, wherein the one or more transceivers enable the at least one controller to establish wireless communication with the nomadic device via the wide-area network and to communicate with the key fob via short-range wireless communication.

8. The base station of claim 1, wherein the at least one controller is further programmed to transmit a remedial action message to the nomadic device indicating removal of the key fob if the key fob is removed from the base station.

9. The base station of claim 8, wherein the remedial action message requests that the vehicle perform at least one of a powertrain shutdown, a reduced powertrain speed, or provide a warning message.

10. A system comprising:
a key fob base station, remote from a vehicle, and configured to receive a key fob paired to the vehicle; and
at least one processor, in communication with the key fob base station and a wide-area network transceiver, programmed to:
receive a security code request from a nomadic device via the transceiver;
verify that the nomadic device is approved to communicate with the key fob located at the key fob base station;
if the key fob is received at the base station and the nomadic device is approved, transmit security codes to the nomadic device via the transceiver; and
if the key fob is removed from the base station, transmit a remedial action message to the nomadic device via the transceiver indicating removal of the key fob.

11. The system of claim 10, wherein the security codes comprise at least one of a manufacturer code, a corresponding key fob serial number, and encrypted data.

12. The system of claim 11, wherein the security codes enable at least one of a unlock request, an ignition start request, a trunk open request, enable alarm request, and a lock request.

13. The system of claim 10, wherein the at least one processor is further configured to receive a remedial action command from the key fob base station via the nomadic device.

14. The system of claim 13, wherein the remedial action command is at least one of a powertrain shutdown, reduce powertrain speed, and a warning message.

15. The system of claim 14, wherein the at least one processor is further configured to output the warning message at an infotainment display to notify a driver of unauthorized possession of the vehicle.

16. The system of claim 10, wherein the at least one processor is further configured to transmit a location data to the key fob base station via the nomadic device.

* * * * *